July 13, 1926.
W. G. HAEHL
1,592,631
CLUTCH PEDAL HOLDER OR RETAINER
Filed April 14, 1926
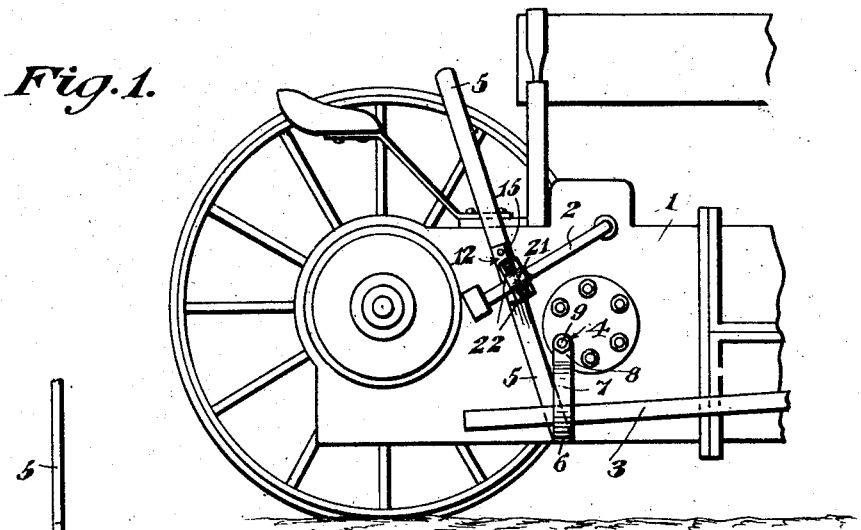
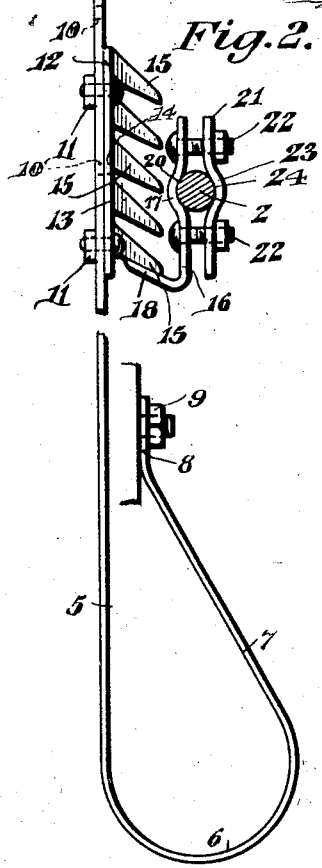
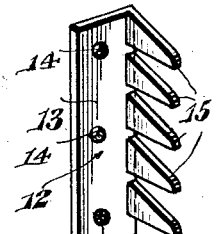
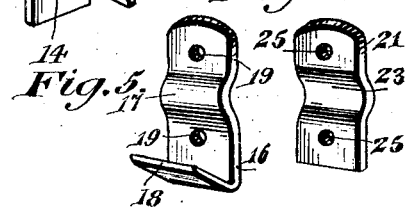
INVENTOR.
William G. Haehl,
BY
Geo. P. Kimmel
ATTORNEY.

Patented July 13, 1926.

1,592,631

UNITED STATES PATENT OFFICE.

WILLIAM G. HAEHL, OF MANILLA, INDIANA.

CLUTCH-PEDAL HOLDER OR RETAINER.

Application filed April 14, 1926. Serial No. 101,977.

This invention relates to a clutch pedal holder or retainer, designed primarily for use in connection with tractors of the Ford type, but it is to be understood that a clutch pedal holder, in accordance with this invention can be employed for use with any type of machine for which it is found applicable, and the invention has for its object to provide, in a manner as hereinafter set forth, a holder or retainer for releasably securing a clutch pedal in operative position during the operation of a tractor to overcome the inconvenience of maintaining the foot constantly on such pedal to hold the latter in the position referred to.

Further objects of the invention are to provide, in a manner as hereinafter set forth, a clutch pedal holder or retainer for the purpose set forth, which is simple in its construction and arrangement, readily applied to a tractor body without changing the construction thereof in any manner, adjustable, strong, durable, resilient, thoroughly efficient and convenient in its use, and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a fragmentary view, in side elevation, of a tractor showing the adaptation therewith of a clutch pedal holder or retainer, in accordance with this invention.

Figure 2 is a fragmentary view, in rear elevation, of a clutch pedal holder or retainer in accordance with this invention.

Figure 3 is a fragmentary view, in perspective, of the hand lever of the device.

Figure 4 is a perspective view of the holder member.

Figure 5 is a perspective view of the retainer member.

Figure 6 is a perspective view of a clamping plate associated with the retaining member.

Referring to the drawings in detail, 1 denotes the body portion of a tractor, 2 the clutch pedal and 3 the exhaust pipe or manifold of the tractor.

A clutch pedal holder or retainer, in accordance with this invention includes a hand lever formed from a substantially elongated narrow bar of spring metal and which is so constructed as to have its lower portion extend around the manifold 3 and be fixedly secured to the body portion 1 of the tractor, as at 4. The hand lever carries a holder member which is normally positioned in the path of the retainer member carried by the pedal 2, so that when the latter is shifted to operative position, the said members will co-act to maintain the pedal in operative position during the operation of the tractor, thereby overcoming the inconvenience of maintaining the foot constantly on the pedal to hold it in the position referred to.

The hand lever includes a resilient arm 5, terminating at its lower end in an upwardly extending offset arcuate coupling portion 6, which merges into an inwardly inclined arm 7, terminating at its upper end into a vertically disposed apertured lug 8, secured at the point 4 by the hold fast device 9 to the tractor body. The arm 5 projects at a rearward inclination with respect to the arm 7 and is of such height to be in convenient reach of the operator of the tractor.

The lower terminal portion of the arm 5 is positioned at the inner side of the exhaust manifold 3, and the coupling portion 6 extends around the bottom and outer side of the exhaust manifold 3, and when the lug 8 is secured to the body portion 1 of the tractor, the coupling portion 6 is maintained in the position referred to. The arm 5 is not fixedly secured to the body portion 1 of the tractor, and owing to the arrangement of the arm 5 and coupling portion 6, said arm 5 is unusually resilient and which allows for the same to be shifted laterally with respect to the clutch pedal 2 whereby the holder and retaining members will be moved clear of each other and the clutch pedal released. When the clutch pedal 2 has been shifted to the desired position, the arm 5 can spring forward whereby the holder and retaining members will coact to maintain the clutch pedal 2 in the desired position.

The arm 5 intermediate its ends is provided with a lengthwise extending set of spaced opening 10 and associating therewith is a pair of hold-fast devices 11 for adjustably securing the holder-member 12 to the arm 5. The holder member 12 consists of a rectangular plate 13 provided with openings 14, and further formed at one side thereof with group of forwardly extending superposed spaced teeth 15, which incline downwardly and are disposed at right angles with respect to the plate 13 and any one of which can be engaged by a clutch pedal retaining member, to be presently referred to, to arrest upward movement of the clutch pedal. The number of openings 14 in the plate 13 is less than the number of openings 10 in the arm 5 and by this arrangement adjustment is had whereby the holder member 12 with its group of teeth can be adjustably positioned lengthwise of the arm 5, that is to say arranged in an elevated or lowered position with respect to the arm 5 to elevate and lower the group of spaced teeth 15.

The retaining member is adapted to be carried by the clutch pedal 2 and consists of a vertically disposed shank 16, formed intermediate its ends with an offset semicircular portion 17 and at its lower end with a bill or hook 18. The shank 16 is provided with spaced openings 19, one arranged above and the other below the offset portion 17. A seat 20 is provided by the offset portion 17 for the reception of one side of a clutch or pedal 2. See Figure 2. The retaining member is fixedly secured to the clutch pedal 2, through the medium of a clamping plate 21 and a pair of hold-fast devices 22. The clamping plate 21 is formed with a centrally disposed semi-circular offset portion 23 which is arranged opposite the offset portion 17 and is oppositely disposed with respect thereto and which further forms a seat 24 for the other side of the clutch pedal 2. The plate 21 is formed with a pair of openings 25 which aline with the openings 19, and extending through the alining openings are the hold-fast devices 22, which clamp the retaining member to the clutch pedal and with said retaining member positioned to engage any one of these teeth 15 when the arm 5 is moved forwardly or sprung forwardly when released.

When the retaining member is in engagement with the holding member, the tendency of the pedal 2 is to move upwardly thereby setting up a binding action between the said members, under such conditions the pedal 2 will be maintained in its depressed position until it is released in the manner hereinbefore stated.

It is thought that many advantages of a clutch pedal holder or retainer in accordance with this invention, can be readily understood, and although the preferred embodiment of the invention is illustrated and described, it is to be understood that changes in the details of construction can be had which will fall within the scope of the invention as claimed.

What I claim is:—

A clutch pedal holder or retainer comprising a hand lever consisting of an elongated bar of metallic material bent to provide an elongated resilient upstanding arm and an upstanding arcuate coupling portion adapted to overlap the exhaust pipe of a tractor, said coupling portion adapted to be fixedly secured to the tractor and said arm extending a substantial distance above said coupling portion, a holder member positioned against the outer side of said arm, means for connecting said holder member to said arm, a retaining member coacting with said holder member for maintaining the clutch pedal in set position, said holder member including a group of laterally extending downwardly inclined superposed spaced teeth, and said retainer member formed with a hook having an upwardly extending inwardly inclined bill coacting with any one of said teeth to maintain the clutch pedal in set position.

In testimony whereof, I affix my signature hereto.

WILLIAM G. HAEHL.